(12) United States Patent
Kim et al.

(10) Patent No.: US 11,442,204 B2
(45) Date of Patent: Sep. 13, 2022

(54) OPTICAL FILM

(71) Applicant: LMS Co., Ltd., Pyeongtaek-si (KR)

(72) Inventors: Jinhwan Kim, Pyeongtaek-si (KR); Taejun Lee, Pyeongtaek-si (KR); Hyeryong Kim, Pyeongtaek-si (KR); Jihoon Lee, Pyeongtaek-si (KR); Seongyong Yoon, Pyeongtaek-si (KR); Jitae Kim, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 43 days.

(21) Appl. No.: 17/094,332

(22) Filed: Nov. 10, 2020

(65) Prior Publication Data

US 2022/0057547 A1     Feb. 24, 2022

(30) Foreign Application Priority Data

Aug. 21, 2020  (KR) .................. 10-2020-0105107

(51) Int. Cl.
| | |
|---|---|
| *G02B 5/02* | (2006.01) |
| *F21V 5/00* | (2018.01) |
| *G02F 1/13357* | (2006.01) |
| *G02B 1/04* | (2006.01) |
| *G02B 3/00* | (2006.01) |

(52) U.S. Cl.
CPC .......... *G02B 5/0221* (2013.01); *F21V 5/004* (2013.01); *G02B 1/041* (2013.01); *G02F 1/133603* (2013.01); *G02F 1/133606* (2013.01); *G02B 2003/0093* (2013.01)

(58) Field of Classification Search
None
See application file for complete search history.

(56) References Cited

U.S. PATENT DOCUMENTS

| | | | |
|---|---|---|---|
| 2005/0122591 | A1 | 6/2005 | Parker et al. |
| 2012/0176772 | A1 | 7/2012 | Maekawa et al. |
| 2013/0308337 | A1 | 11/2013 | Chang et al. |
| 2015/0153483 | A1 | 6/2015 | Endoh et al. |

(Continued)

FOREIGN PATENT DOCUMENTS

| | | | |
|---|---|---|---|
| CN | 101164006 A | | 4/2008 |
| CN | 102597819 | * | 8/2014 |

(Continued)

OTHER PUBLICATIONS

Taiwan Office Action dating Jun. 2, 2021 in connection with the Taiwan Patent Application No. 109138578 citing the above reference(s).

*Primary Examiner* — Ashok Patel
(74) *Attorney, Agent, or Firm* — Hauptman Ham, LLP

(57) ABSTRACT

An optical film is disclosed. The optical film may include a first base film, and a diffusion lens layer disposed on one surface of the first base film and including a plurality of square pyramid-shaped lenses. Edges meeting at vertices of the plurality of square pyramid-shaped lenses may be curved lines. Among the plurality of square pyramid-shaped lenses, one surface of a first square pyramid-shaped lens may meet one surface of a second square pyramid-shaped lens to form a boundary line, and the one surface of the first square pyramid-shaped lens and the one surface of the second square pyramid-shaped lens may be symmetrical with respect to the boundary line as an axis.

12 Claims, 11 Drawing Sheets

(56) References Cited

U.S. PATENT DOCUMENTS

2016/0116646 A1* 4/2016 Araki .................. G02B 6/0011
　　　　　　　　　　　　　　　　　　　　　　349/112
2020/0174317 A1 6/2020 Chang

FOREIGN PATENT DOCUMENTS

| KR | 10-2010-0095765 A | 9/2010 |
| KR | 10-2012-0003277 A | 1/2012 |
| TW | 201109741 A | 3/2011 |
| TW | 201348813 A | 12/2013 |
| TW | 202020491 A | 6/2020 |
| WO | 2006/073616 A1 | 7/2006 |
| WO | 2010/131757 A1 | 11/2010 |
| WO | 2013/183708 A1 | 12/2013 |
| WO | 2020/162678 A1 | 8/2020 |

\* cited by examiner

|  | First Test | Second Test |
|---|---|---|
| Thickness (μm) | 458 | 458 |
| Luminance (9P average, %) | 122.4% | 125.5% |
| HSV (%) | 2.2% | 2.4% |
| x / y | 0.221/0.1986(-0.0026) | 0.2187 / 0.1937(-0.0075) |
| Half angle Θx / Θy | 45 / 46 | 45 / 46 |
| FOV | | |
| Structure | | |

FIG.13

OPTICAL FILM

CROSS-REFERENCE TO RELATED APPLICATION(S)

This application is based on and claims priority under 35 U.S.C. § 119 to Korean Patent Application No. 10-2020-0105107, filed on Aug. 21, 2020, in the Korean Intellectual Property Office, the disclosure of which is incorporated by reference herein in its entirety.

BACKGROUND

Field

The disclosure relates to an optical film, and more particularly, to an optical film that splits and diffuses light emitted from a light source.

Description of Related Art

Backlights are generally classified into an edge type and a direct type according to the locations of the backlights.

Edge-lit backlights are located along the edges of a liquid crystal panel and emit light to the liquid crystal panel through a light guide plate. Therefore, it is difficult to adopt edge-lit backlights for a large-area liquid crystal panel, compared to direct-lit backlights. Moreover, it is difficult to achieve high luminance with the edge-lit backlights in view of supply of light through the light guide plate.

Direct-lit backlighting is a scheme of irradiating light toward a panel from under a liquid crystal panel by lamps or light emitting diodes (LEDs) as light sources located behind the rear surface of the liquid crystal panel. Because light from the light sources is directly incident on the liquid crystal panel, the direct-light backlights may have high luminance and are easily applied to a large-area panel.

Techniques of applying small-sized LED chips to the direct-lit backlights are under active development. This is because small-sized LED chips facilitate the implementation of small-sized, lightweight, and low-power products.

Small-sized LEDs have more or less a different optical property from legacy LEDs in that the optical distance (OD) between an LED chip and an optical film is reduced in the former. To supplement the optical property, division and diffusion of light from small-sized LEDs is also under study.

For example, Korean Patent Publication No. 10-2010-0095765 (published on Sep. 1, 2010) relates to an optical sheet with improved luminance and enhanced concealment of lamps, disclosing a front light diffusion layer on which concave microlenses are randomly arranged in hollow relief on the front surface of the sheet.

In another example, Korean Patent Publication No. 10-2012-0003277 (published on Jan. 10, 2012) relates to the structure of a backlight unit, disclosing a plurality of LED light sources formed on a printed circuit board (PCB), a resin layer that guides forward diffusion of emitted light, an optical pattern layer disposed on the resin layer and including an optical pattern, and a diffusion plate disposed on the optical pattern later and having a microlense array (MLA) pattern formed thereon.

SUMMARY

Provided is an optical film for minimizing the visibility of vertex portions of a plurality of square pyramid-shaped lenses arranged on the optical film and preventing non-uniform exterior defects.

Provided is also an optical film for minimizing the luminance loss of light emitted from small-sized light emitting diodes (LEDs) and reducing generation of hot spots by evenly diffusing light.

Provided is also an optical film for minimizing the luminance loss of light emitted from small-sized LEDs during conversion of the light to white light.

Additional aspects will be set forth in part in the description which follows and, in part, will be apparent from the description, or may be learned by practice of the presented embodiments of the disclosure.

According to an embodiment of the disclosure, an optical film may include a first base film, and a diffusion lens layer disposed on one surface of the first base film and including a plurality of square pyramid-shaped lenses. Edges meeting at vertices of the plurality of square pyramid-shaped lenses may be curved lines. Among the plurality of square pyramid-shaped lenses, one surface of a first square pyramid-shaped lens may meet one surface of a second square pyramid-shaped lens to form a boundary line, and the one surface of the first square pyramid-shaped lens and the one surface of the second square pyramid-shaped lens may be symmetrical with respect to the boundary line as an axis.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a table listing test results of the performance of an optical film according to an embodiment of the disclosure.

DETAILED DESCRIPTION

The operation principle of preferred embodiments of the disclosure will be described below in detail with reference to the attached drawings. A detailed description of a generally known function or structure of the disclosure will be avoided lest it should obscure the subject matter of the disclosure. Although the terms used in the present disclosure are defined in consideration of functions in the embodiments of the disclosure, the terms may be changed according to the intention of a user or an operator, or customs. Therefore, the definitions should be made, not simply by the actual terms used but by the meanings of each term lying within.

A backlight unit is a light source for a liquid crystal display (LCD). The LCD does not emit light autonomously. Therefore, a backlight unit with light sources irradiates light toward a liquid crystal panel from the rear surface of the LCD, forming an identifiable image.

The backlight unit uses cold cathode fluorescent lamps (CCFLs), external electrode fluorescent lamps, light emitting diodes (LEDs), or the like, as light sources.

The backlight unit is classified as an edge type or a direct type depending on the arrangement structure of light sources. Compared to an edge-lit backlight unit, a direct-lit backlight unit enables separate driving and thus may form elaborate images.

An optical film included in a direct-lit LED backlight unit will be described below in detail.

Figure 1:
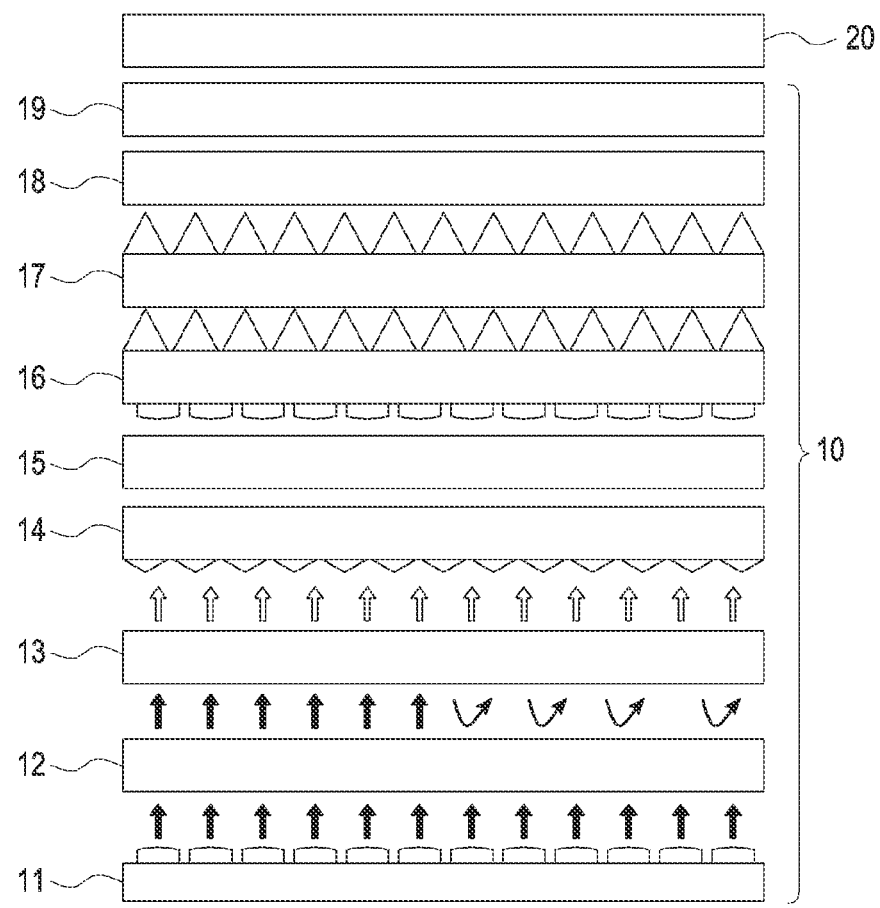
FIG. 1 is an exploded view illustrating a liquid crystal display (LCD) according to an embodiment of the disclosure.

FIG. 1 is an exploded view illustrating an LCD according to an embodiment of the disclosure.

Referring to FIG. 1, an LCD (or LCD device) 1 includes a backlight unit 10 and a liquid crystal panel 20. In general, the backlight unit 10 may be located behind the liquid crystal panel 20 to irradiate light onto the liquid crystal panel 20. The backlight unit 10 may include a light source 11, a reflection sheet 12, a color conversion sheet 13, a diffusion lens sheet 14, diffusion sheets 15 and 18, prism sheets 16 and 17, and a reflective polarization sheet 19. At least one of the components 11 to 19 may be omitted in the backlight unit 10 or any other component may be added to the components 11 to 19 in the backlight unit 10. Further, the backlight unit 10 may be configured with any of various combinations including at least one of the components 11 to 19.

Figure 2:
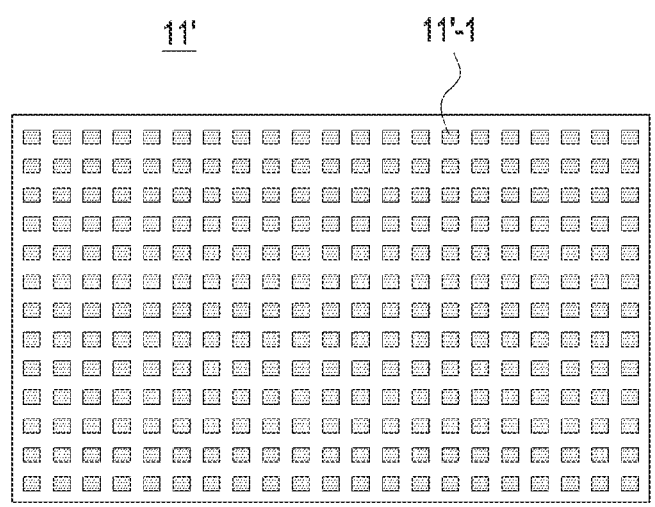
FIG. 2 is a diagram illustrating direct-lit light emitting diode (LED) light sources according to an embodiment of the disclosure.

The light source 11 emits light. For example, the light source 11 may include a plurality of LED chips that emit light. For example, referring to FIG. 2, LED chips 11'-1 may be arranged in a grid, thus forming a direct-lit light source 11'.

Depending on their LED chip sizes, LEDs may be categorized into large LED (a chip size of 1,000 μm or larger), middle LED (a chip size of 300 μm to 500 μm), small LED (a chip size of 200 μm to 300 μm), mini LED (a chip size of 100 μm to 200 μm), and micro LED (a chips size of 100 μm or less). The LEDs may be formed of a material containing InGaN, GaN, or the like.

As the chip size of the LEDs is smaller in the backlight unit 10, the number of the LEDs may easily be adjusted, thereby improving the luminance property and color uniformity of the LCD 1 and enabling the LCD 1 to be slim. Further, the smaller chip size of the LEDs may lead to reduced power consumption. Therefore, a portable device may have reduced battery consumption and an increased battery lifetime.

Compared to legacy direct-lit LEDs, mini LEDs or micro LEDs enable local dimming because of their smaller sizes. The local dimming may improve image quality and increase power efficiency. The local dimming is a technique of controlling the brightness of LEDs used as backlights based on the composition or characteristics of a screen. The local dimming may remarkably increase a contrast ratio and reduce power consumption. In an example of the local dimming, a dark color may be represented by relatively decreasing the brightness of mini LEDs or micro LEDs corresponding to a dark screen, and a clear color may be represented by relatively increasing the brightness of mini LEDs or micro LEDs corresponding to a bright screen.

The reflection sheet 12 reflects light. The reflection sheet 12 may transmit light emitted from the light source 11 in a light irradiation direction, and reflects light reflected from above by interfacial reflection in the light irradiation direction. Therefore, light loss may be minimized. The reflection sheet 12 may perform light recycling.

The color conversion sheet 13 converts the color of the light emitted from the light source 11. For example, light from mini LEDs or micro LEDs is blue light in 450 nm. The blue light needs conversion to white light. The color conversion sheet 13 may convert blue light to white light, simultaneously with transmitting the blue light.

The diffusion lens sheet 14 diffuses the light. The diffusion lens sheet 14 has a plurality of light diffusion lenses arranged on one surface thereof. For example, each of the light diffusion lenses may be shaped into a square pyramid to accelerate light diffusion.

The diffusion sheets 15 and 18 may diffuse incident light evenly. The diffusion sheets 15 and 18 may be coated with a curing resin solution (for example, a solution containing at least one of urethane acrylate, epoxy acrylate, ester acrylate, ester acrylate, or radical-generating monomers, alone or as a mixture) to cause light diffusion by light diffusing agent beads. Further, the diffusion sheets 15 and 18 may have protrusion patterns (or protrusions) of shapes (for example, spheres) of the same or different sizes arranged thereon to accelerate the light diffusion.

The prism sheets 16 and 17 may collect incident light by using optical patterns formed on surfaces thereof and emit the collected light to the liquid crystal panel 20. Each of the prism sheets 16 and 17 may be formed to be an optical pattern layer on which optical patterns are formed in an array of triangles each having an inclined surface at 45° to improve luminance in a forward direction on a transmissive base film.

The reflective polarization sheet 19 may be provided above the prism sheets 16 and 17, and may serve to transmit one polarization of the light collected from the prism sheets 16 and 17 and reflect the other polarization of the light downward, thereby recycling the light.

The liquid crystal panel 20 modulates the light irradiated from the light source 11 to a predetermined pattern. The modulated light passes through a color filter and a polarization filter arranged on the front surface of the liquid crystal panel 20 to form a screen.

The configuration of the LCD 1 according to the embodiment of the disclosure has been described above. While it is assumed that mini LEDs or micro LEDs are used as the light source 11 of the backlight unit 10 in various embodiments of the disclosure, the various embodiments of the disclosure are also applicable to the backlight unit 10 including the light source 11 in which LEDs of the same or different sizes are arranged in a direct type, without limitations.

Now, a detailed description will be given of an optical film according to various embodiments of the disclosure.

The optical film may be defined as the diffusion lens sheet 14 of FIG. 1 or as a combination of the diffusion lens sheet 14 of FIG. 1 and at least one of the reflection sheet 12, the color conversion sheet 13, the diffusion sheets 15 and 18, the prism sheets 16 and 17, or the reflective polarization sheet 19.

Hereinafter, a square pyramid-shaped lens is defined as a lens having a square base. The square pyramid-shaped lens may have a vertex portion shaped into a line, not a dot, and edges of straight lines or curved lines.

Figure 3:
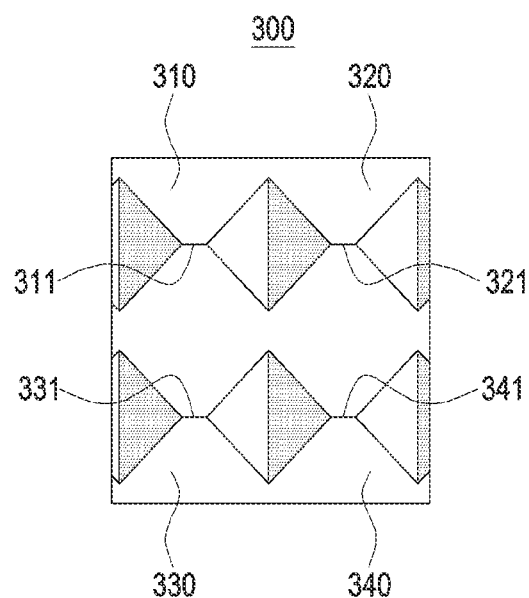
FIG. 3 is a plan view illustrating an optical film, referred to for describing a conventional problem.
Figure 4:
FIG. 4 is a sectional view illustrating the optical film, referred to for describing the conventional problem.

FIG. 3 is a plan view illustrating an optical film, referred to for describing a conventional problem, and FIG. 4 is a sectional view illustrating the optical film, referred to for describing the conventional problem.

Referring to FIG. 3, a plurality of square pyramid-shaped lenses 310, 320, 330, and 340 are arranged on one surface of an optical film 300. The visibility of vertex portions 311, 321, 331, and 341 of the plurality of square pyramid-shaped lenses 310, 320, 330, and 340 may be changed according to the shapes of the vertex portions 311, 321, 331, and 341. For example, when the vertex portions 311, 321, 331, and 341 have equal heights and are shaped into dots, the degree to which the vertex portions 311, 321, 331, and 341 are visually exposed may be minimized.

However, the vertex portions 311, 321, 331, and 341 of the plurality of square pyramid-shaped lenses 310, 320, 330, and 340 may have different heights (see FIG. 4) or the ratio of the number of line-shaped vertex portions 311, 321, 331, and 341 to the number of dot-shaped vertex portions may be increased, due to errors during fabrication.

In this case, the vertex portions 311, 321, 331, and 341 of the plurality of square pyramid-shaped lenses 310, 320, 330, and 340 may be visible to a user, which may decrease user satisfaction. For example, the exterior lines of the optical film 300 may be visually exposed.

Figure 5:
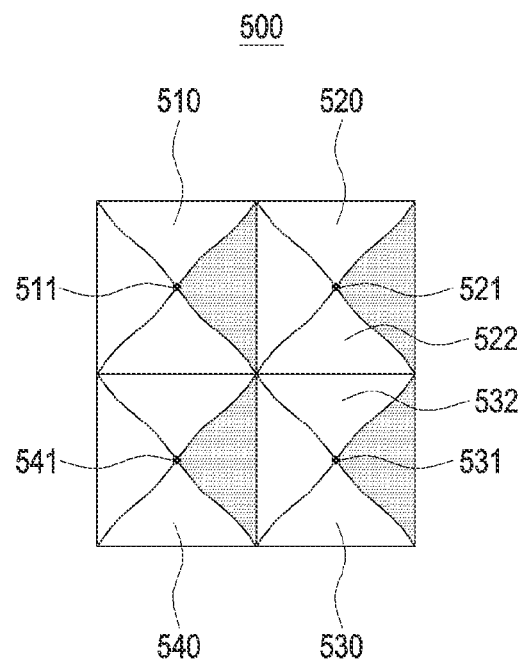
FIG. 5 is a plan view illustrating an optical film according to an embodiment of the disclosure.

FIG. 5 is a plan view illustrating an optical film according to an embodiment of the disclosure.

Referring to FIG. 5, a plurality of square pyramid-shaped lenses 510, 520, 530, and 540 are arranged on one surface of an optical film 500. The edges of the plurality of square pyramid-shaped lenses 510, 520, 530, and 540 may be curved lines.

In the above example, as the plurality of square pyramid-shaped lenses 510, 520, 530, and 540 are formed to have curved edges, vertex portions 511, 521, 531, and 541 of the plurality of square pyramid-shaped lenses 510, 520, 530, and 540 may be formed to be vertices 511, 521, 531, and 541. Accordingly, the visibility of the vertices 511, 521, 531, and 541 of the plurality of square pyramid-shaped lenses 510, 520, 530, and 540 may be decreased greatly.

Further, the edges meeting at the vertices 511, 521, 531, and 541 of the plurality of square pyramid-shaped lens 510, 520, 530, and 540 may be curved lines. In this case, surfaces facing each other in the plurality of square pyramid-shaped lens 510, 520, 530, and 540 may be symmetrical.

For example, one surface 522 of a first square pyramid-shaped lens 520 faces one surface 532 of a second square pyramid-shaped lens 530 among the plurality of square pyramid-shaped lens 510, 520, 530, and 540.

In the above example, it may be defined that surfaces (one surface and the other surface) facing each other meet, thus forming a boundary line.

For example, the surface 522 of the first square pyramid-shaped lens 520 may meet the surface 532 of the second square pyramid-shaped lens 530 among the plurality of square pyramid-shaped lens 510, 520, 530, and 540, thus forming a boundary line. In this case, the surface 522 of the first square pyramid-shaped lens 520 and the surface 532 of the second square pyramid-shaped lens 530 may be defined as facing surfaces. The surface 522 of the first square pyramid-shaped lens 520 and the surface 532 of the second square pyramid-shaped lens 530 may be symmetrical with respect to the boundary line.

In the above-described various embodiments of the disclosure, facing surfaces of the plurality of square pyramid-shaped lens 510, 520, 530, and 540 may be formed to be symmetrical regardless of whether the surfaces are flat or curved (three-dimensional).

Figure 6:
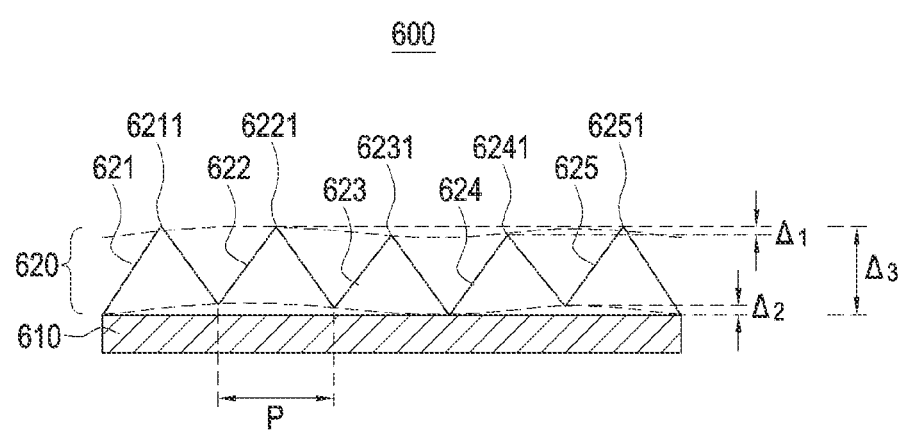
FIG. 6 is a sectional view illustrating an optical film according to an embodiment of the disclosure.

FIG. 6 is a sectional view illustrating an optical film according to an embodiment of the disclosure.

Referring to FIG. 6, an optical film 600 may include a base film 610 and a diffusion lens layer 620 which includes a plurality of square pyramid-shaped lenses 621, 622, 623, 624, and 625.

The heights of vertices 6211, 6221, 6231, 6241, and 6251 of plurality of square pyramid-shaped lenses 621, 622, 623, 624, and 625 are random within a predefined boundary (deviation $\Delta$) in the optical film 600.

For example, the difference or gap (for example, a first deviation $\Delta 1$) between the maximum and minimum heights of the vertices 6211, 6221, 6231, 6241, and 6251 of the plurality of square pyramid-shaped lenses 621, 622, 623, 624, and 625 may be 2.5 μm or less. According to an embodiment, the first deviation $\Delta 1$ may be set to 15% or less of the length (for example, 40 μm) of the pitch P of the plurality of square pyramid-shaped lenses 621, 622, 623, 624, and 625. The heights of the vertices 6211, 6221, 6231, 6241, and 6251 of the plurality of square pyramid-shaped lenses 621, 622, 623, 624, and 625 may be lengths between one surface of the base film 610 (for example, a surface of the base film 610 on which the plurality of square pyramid-shaped lenses 621, 622, 623, 624, and 625 are arranged) and the vertices 6211, 6221, 6231, 6241, and 6251 of the plurality of square pyramid-shaped lenses 621, 622, 623, 624, and 625.

In another example, the difference (for example, a second deviation $\Delta 2$)) between the maximum and minimum of the heights of boundary lines each being defined between two square pyramid-shaped lenses may be 2.5 μm or less. According to an embodiment, the second deviation $\Delta 2$ may be set to 15% or less of the length (for example, 40 μm) of the pitch P of the plurality of square pyramid-shaped lenses 621, 622, 623, 624, and 625. The heights of the boundary lines each being defined between two square pyramid-shaped lenses among the plurality of square pyramid-shaped lenses 621, 622, 623, 624, and 625 may be lengths between one surface of the base film 610 (for example, the surface of the base film 610 on which the plurality of square pyramid-shaped lenses 621, 622, 623, 624, and 625 are arranged) and the boundary lines each being defined between two square pyramid-shaped lenses. In another example, the difference (for example, a third deviation $\Delta 3$) between the minimum of the heights of the boundary lines each being defined between two square pyramid-shaped lenses and the maximum of the heights of the vertices 6211, 6221, 6231, 6241, and 6251 of the plurality of square pyramid-shaped lenses 621, 622, 623, 624, and 625 may be 6.16 μm to 9.28 μm. According to an embodiment, the third deviation $\Delta 3$ may be set to 25% or less of the length (for example, 40 μm) of the pitch P of the plurality of square pyramid-shaped lenses 621, 622, 623, 624, and 625.

In various embodiments of the disclosure, the visibility of the vertices 6211, 6221, 6231, 6241, and 6251 of the plurality of square pyramid-shaped lenses 621, 622, 623, 624, and 625 may be reduced according to the shapes of the plurality of square pyramid-shaped lenses 621, 622, 623, 624, and 625. According to an embodiment, because the vertices 6211, 6221, 6231, 6241, and 6251 are formed to have random heights, light may be emitted randomly onto the front surface of a display (for example, an LCD). The random emission of light may reduce the visibility of the shapes of the vertices 6211, 6221, 6231, 6241, and 6251 of the plurality of square pyramid-shaped lenses 621, 622, 623, 624, and 625. According to an embodiment, the plurality of square pyramid-shaped lenses 621, 622, 623, 624, and 625 may be formed to have randomly curved surfaces. Light reaching the plurality of square pyramid-shaped lenses 621, 622, 623, 624, and 625 may travel in different directions (for example, in non-parallel directions) from the curved surfaces. For example, the light reaching the plurality of square pyramid-shaped lenses 621, 622, 623, 624, and 625 may be scattered, thereby reducing the visibility of the vertices 6211, 6221, 6231, 6241, and 6251.

Figure 7:
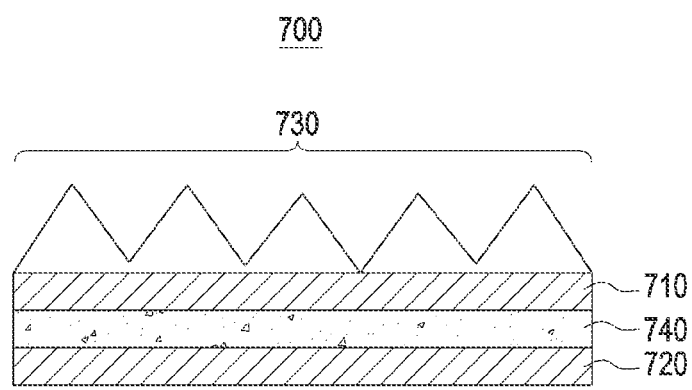
FIG. 7 is a sectional view illustrating an optical film according to another embodiment of the disclosure.

FIG. 7 is a sectional view illustrating an optical film according to another embodiment of the disclosure.

Referring to FIG. 7, an optical film 700 may include a first base film 710, a second base film 720, a diffusion lens layer 730, and a color conversion layer 740.

A redundant description with the descriptions of the optical films 500 and 600 will be avoided herein.

The first base film 710 and the second base film 720 may be arranged in parallel.

The color conversion layer 740 converts a color. The color conversion layer 740 may convert blue light emitted from mini LEDs or micro LEDs to white light.

The color conversion layer 740 may be interposed between the first base film 710 and the second base film 720.

The color conversion layer 740 may include red phosphor, green phosphor, and inorganic particles. The red phosphor or the green phosphor is a material that generates red light or green light by absorbing light irradiated from the mini LEDs or the micro LEDs. For example, the red phosphor may be KSF($K_2SiF_6$:Mn4+) phosphor, and the green phosphor may be β-SiALON phosphor. Further, the inorganic particles are used to induce uniform scattering. For example, the inorganic particles may be TiO2 or SiO2 with a diameter of hundreds of nanometers.

For example, the color conversion layer 740 may be formed by stirring the red phosphor, the green phosphor, and the inorganic particle in resin (silicon, acrylic, or the like). In this case, the color conversion layer 740 may be attached between the first base film 710 and the second base film 720.

For example, the color conversion layer 740 may include the red phosphor, the green phosphor, and the inorganic particles at a predefined weight ratio. The predefined weight ratio is a ratio among the weight of the red phosphor, the weight of the green phosphor, and the weight of the inorganic particles, determined based on the color coordinate values of white light.

Figure 8:
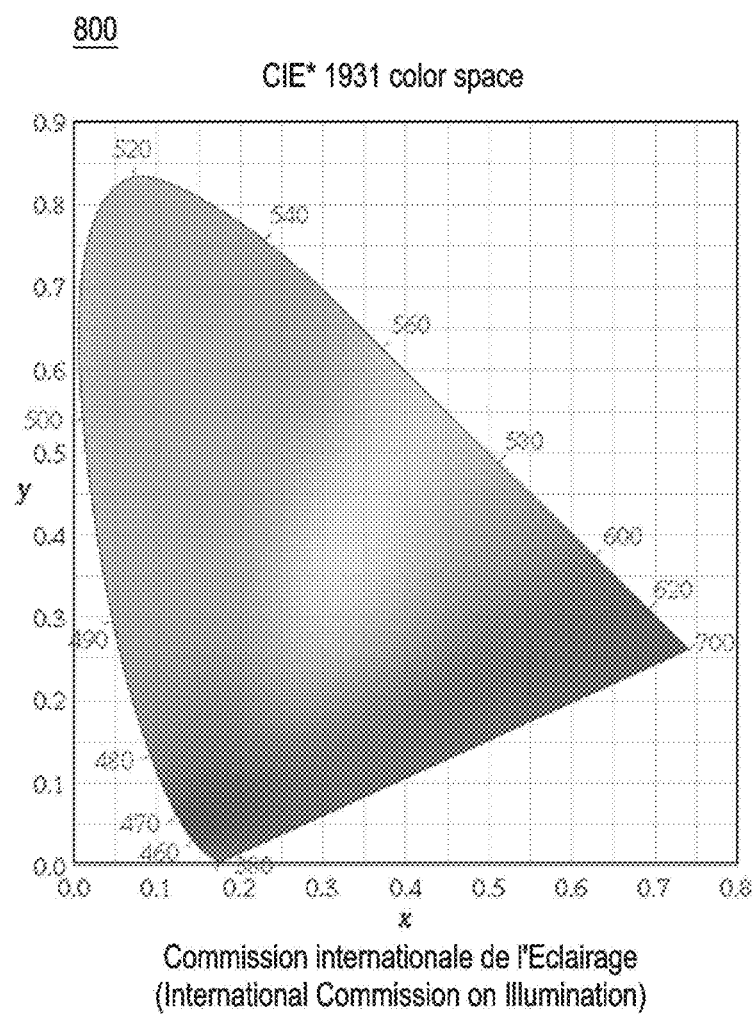
FIG. 8 is a Commission internationale de l'éclairage (CIE) 1931 chromaticity diagram according to an embodiment of the disclosure.

Referring to FIG. 8, the color coordinate values of white light may be defined based on a Commission Internationale de l'Eclairage (CIE) color space 800. In this case, the color coordinate value of white light may be defined as an X coordinate value, a Y coordinate value, and a Z coordinate value defined in the color space 800.

For example, the X coordinate value and the Y coordinate value may be defined as 0.27 to 0.33, and the Z coordinate value may be defined as a dependent variable based on the defined X coordinate and Y coordinate.

For example, the weight ratio of the red phosphor may be defined within 10% to 80%, the weight ratio of the green phosphor is defined within 10% to 80%, and the weight ratio of inorganic particles may be defined as 1% to 10%. In this case, the total sum of the weight ratio of the red phosphor, the weight ratio of the green phosphor, and the weight ratio of the inorganic particles may be defined naturally as 100% or less. In addition, when the weight ratio is not defined in %, the total sum of the weight ratios may be defined as above 100 as well as 100 or below.

An example in which the weight ratio of the red phosphor is set to be larger than the weight ratio of the green phosphor and the weight ratio of the green phosphor is set to be larger than the weight ratio of the inorganic particles will be described with reference to FIG. 9.

Figure 9:
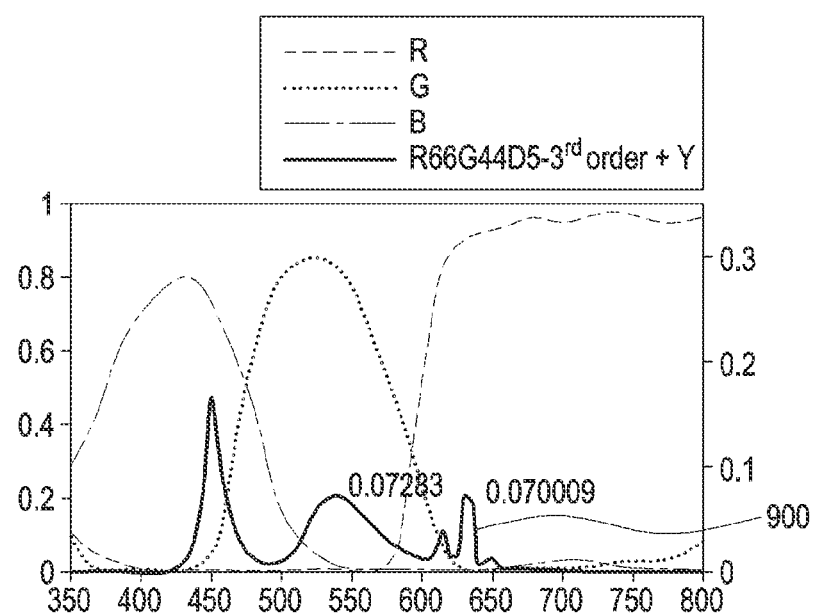
FIG. 9 is a graph illustrating spectral spectrum measurement results according to an embodiment of the disclosure.

FIG. 9 illustrates spectral spectrum measurement results according to an embodiment of the disclosure.

In the embodiment of FIG. 9, the ratio of the weight of the red phosphor, the weight of the green phosphor, and the weight of the inorganic particles included in the color conversion layer 740 is set to 66:44:5. Blue light emitted from the mini LEDs or the micro LEDs is converted to white light while passing through the color conversion layer (or optical film) 740. At the same time, the light may be uniformly scattered and thus provide a mura-free exterior as indicated by reference numeral 900.

The optical film 700 according to the above-described embodiment of FIG. 7 may further include an inorganic particle layer, which will be described below with reference to FIG. 10. A configuration redundant with the above-described optical film 700 will not be described for convenience.

Figure 10:
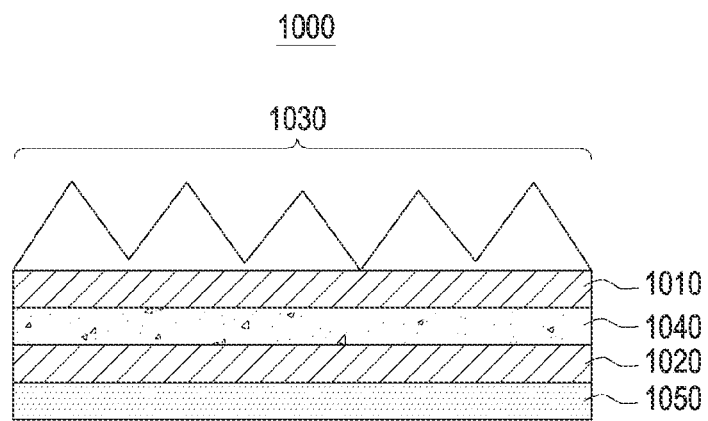
FIG. 10 is a sectional view illustrating an optical film according to another embodiment of the disclosure.

FIG. 10 is a sectional view illustrating an optical film according to another embodiment of the disclosure.

Referring to FIG. 10, an optical film 1000 may include a first base film 1010, a second base film 1020, a diffusion lens layer 1030, a color conversion layer 1040, and an inorganic particle layer 1050.

The inorganic particle layer 1050 may include the above-described inorganic particles. For example, the inorganic particle layer 1050 may be formed by stirring inorganic particles and resin. In this case, the inorganic particle layer 1050 may be attached to one surface of the first base film 1010.

In the above example, the inorganic particle layer 1050 may further include the above-described red phosphor and green phosphor. Further, the position of the inorganic particle layer 1050 may be exchanged with the position of the color conversion layer 1040. Further, the inorganic particle layer 1050 may be attached to one surface of the second base film 1020.

Figure 11:
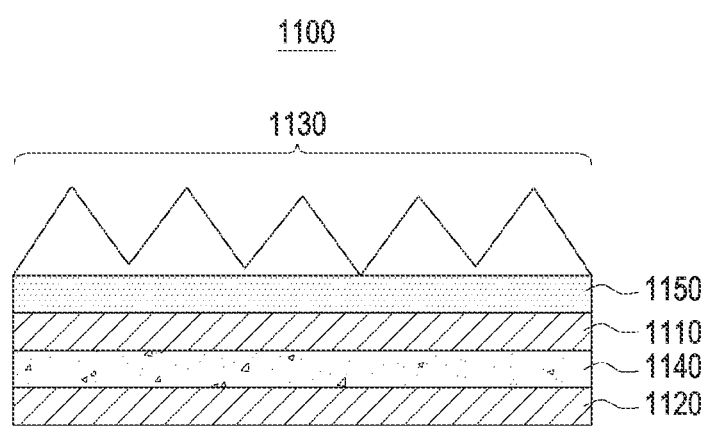
FIG. 11 is a sectional view illustrating an optical film according to another embodiment of the disclosure.

FIG. 11 is a sectional view illustrating an optical film according to another embodiment of the disclosure.

Referring to FIG. 11, an optical film 1100 may include a first base film 1110, a second base film 1120, a diffusion lens layer 1130, a color conversion layer 1140, and an inorganic particle layer 1150. The inorganic particle layer 1150 may be disposed on the top surface of the first base film 1110. Further, the diffusion lens layer 1130 may be disposed on the top surface of the inorganic particle layer 1150.

In the various embodiments of the disclosure described above, each of the optical films 500, 600, 700, 1000, and 1100 may further include a reflection pattern. Various embodiments including a reflection pattern will be described below in detail.

Figure 12:
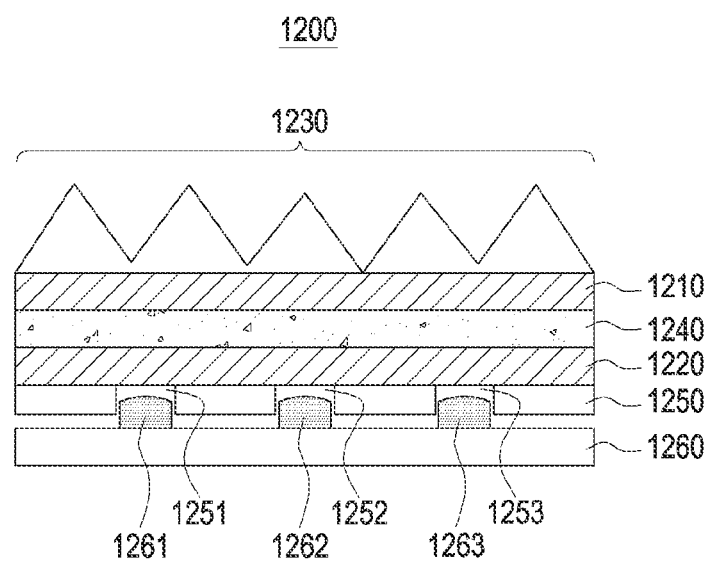
FIG. 12 is a sectional view illustrating an optical film according to another embodiment of the disclosure.

FIG. 12 is a sectional view illustrating an optical film according to another embodiment of the disclosure.

Referring to FIG. 12, an optical film 1200 may include a first base film 1210, a second base film 1220, a diffusion lens layer 1230, a color conversion layer 1240, and reflection patterns 1250.

The reflection patterns 1250 reflect light. The reflection patterns 1250 may reflect light to implement light recycling.

The reflection patterns 1250 may be disposed or attached to at least one of one side of the first base film 1210 or one side of the second base film 1220. For example, the reflection patterns 1250 may be formed on one side of the first base film 1210 or on one side of the second base film 1220 in a light/ultraviolet (UV) curing process. The reflection patterns 1250 may be regular or irregular in shape.

For example, areas 1251, 1252, and 1253 between the reflection patterns 1250 may correspond to the positions of mini LEDs 1261, 1262, and 1263 or the positions of micro LEDs 1261, 1262, and 1263. Specifically, the areas 1251, 1252, and 1253 between the reflection patterns 1250 may accommodate the mini LEDs 1261, 1262, and 1263 or the micro LEDs 1261, 1262, and 1263.

According to the above configuration, local dimming that enables individual control of the mini LEDs 1261, 1262, and 1263 or the micro LEDs 1261, 1262, and 1263 may be implemented. Light luminance may be adjusted by the local dimming. Further, since reflection pattern areas other than the areas 1251, 1252, and 1253 between the reflection patterns 1250 fulfill light reflection, light recyclability may be increased.

For example, the areas 1251, 1252, and 1253 between the reflection patterns 1250 may include red phosphor, green phosphor, and inorganic particles at a predefined weight ratio, like the color conversion layer 1240. In this case, the optical film 1200 may perform color conversion without the separate color conversion layer 1240.

A backlight unit according to various embodiments of the disclosure may include any of the optical films 500, 600, 700, 1000, 1100, and 1200. Further, an LCD according to various embodiments of the disclosure may include an LCD panel and the backlight unit positioned under the LCD panel.

Figure 14:
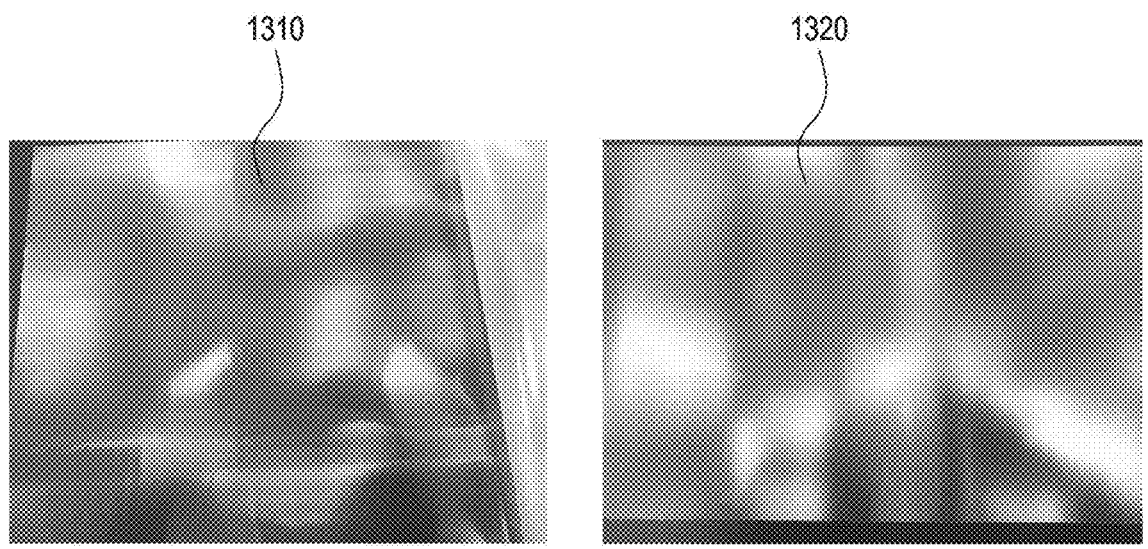
FIG. 14 is a diagram illustrating a conventional optical film and an optical film according to an embodiment of the disclosure.

FIG. 13 illustrates performance test results of an optical film according to an embodiment of the disclosure. FIG. 14 illustrates a conventional optical film and an optical film according to an embodiment of the disclosure.

A sheet assembly (of a total thickness of 458 μm) in a first test is a sequential stack of the two prism sheets 16 and 17 of FIG. 1 (a thickness of 100 μm), two optical films 300 of FIG. 3 (a thickness of 194 μm), and the color conversion sheet 13 of FIG. 1 (a thickness of 164 μm) in this order. A sheet assembly (of a total thickness of 458 μm) in a second test is a sequential stack of the two prism sheets 16 and 17 of FIG. 1 (a thickness of 100 μm), two optical films 600 of FIG. 6 (a thickness of 194 μm), and the color conversion sheet 13 of FIG. 1 (a thickness of 164 μm) in this order.

In the second test, the luminance measurement is 125.5%, 1.1% higher than a luminance of 122.4% in the first test.

Further, in the second test, the hot spot visibility (HSV) measurement is 2.4%, 0.2% higher (9.09% in percentage) than an HSV of 2.2% in the first test.

According to the first and second tests described above, the optical films 500, 600, 700, 1000, 1100, and 1200 according to various embodiments of the present invention increase luminance and greatly improve HSV. Thus, excellent user experience may be provided.

Further, the above-described optical films 500, 600, 700, 1000, 1100, and 1200 according to various embodiments of the disclosure may minimize visibility of the vertex portions of a plurality of square pyramid-shaped lenses. For example, referring to FIG. 14, the exterior lines of a conventional optical film 1310 (for example, the optical film 300 of FIG. 3) may be visually exposed. The degree to which the exterior lines of an optical film 1320 of the disclosure are visually exposed may be smaller than that of the conventional optical film 1310. The optical film 1320 may have the same configuration as or a similar configuration to the configurations of the above-described optical films 500, 600, 700, 1000, 1100, and 1200.

Further, the above-described optical films 500, 600, 700, 1000, 1100, and 1200 according to various embodiments of the disclosure may minimize the luminance loss of light emitted from small-sized LEDs and uniformly diffuse the light, thereby reducing generation of hot spots.

Further, the above-described optical films 500, 600, 700, 1000, 1100, and 1200 according to various embodiments of the disclosure may minimize the luminance loss of light emitted from small-sized LEDs during conversion of the light to white light.

As is apparent from the forgoing description, according to various embodiments of the disclosure, the visibility of exterior lines may be improved, while the visibility of vertex portions of a plurality of square pyramid-shaped lenses arranged on an optical film is minimized.

According to various embodiments of the disclosure, the luminance loss of light emitted from small-sized LEDs may be minimized, and the light may be evenly diffused. Therefore, generation of hot spots may be reduced.

According to various embodiments of the disclosure, the luminance loss of light emitted from small-sized LEDs may be minimized during conversion of the light to white light.

While embodiments of the disclosure have been shown and described above, it will be understood that those skilled in the art can make various modifications in form and details without departing from the spirit and scope of the disclosure as defined by the appended claims and their equivalency.

What is claimed is:

1. An optical film comprising:
a first base film; and
a diffusion lens layer disposed on one surface of the first base film and including a plurality of square pyramid-shaped lenses,
wherein each square pyramid-shaped lens of the plurality of square pyramid-shaped lenses comprises:
an apex;
a square-shaped base surface having four corners; and
four edges joining the apex to the four corners of the square-shaped base surface,
wherein each of the four edges of the each square pyramid-shaped lens is curved,
wherein among the plurality of square pyramid-shaped lenses, a first and a second quadrangular pyramid-shaped lenses are adjacent to each other such that an edge of a square-shaped base surface of the first quadrangular pyramid-shaped lens contacts an edge of a square-shaped base surface of the second quadrangular pyramid-shaped lens and forms a boundary line between the first and second quadrangular pyramid-shaped lenses, and
wherein one lateral surface of the first quadrangular pyramid and one lateral surface of the second quadrangular pyramid facing each other are symmetrical with respect to the boundary line.

2. The optical film of claim 1, wherein the difference between maximum and minimum ones of heights, from the one surface of the first base film, of apexes of the plurality of square pyramid-shaped lenses is 2.5 μm or less.

3. The optical film of claim 1, wherein the difference between the maximum and minimum ones of heights, from the one surface of the first base film, of boundary lines each being defined between a plurality of two adjacent square pyramid-shaped lenses among the plurality of square pyramid-shaped lenses is 2.5 μm or less.

4. The optical film of claim 3, wherein the difference between the minimum one of the heights of boundary lines each being defined between two adjacent square pyramid-shaped lenses among the plurality of square pyramid-shaped lenses and the maximum one of the heights of the apexes of the plurality of square pyramid-shaped lenses is 25% or less of the length of a pitch of the plurality of square pyramid-shaped lenses.

5. The optical film of claim 1, further comprising:
   a second base film disposed in parallel to the first base film; and
   a color conversion layer disposed between the other surface of the first base film and one surface of the second base film,
   wherein the color conversion layer includes red phosphor, green phosphor, and inorganic particles inducing uniform scattering of the light at a predefined weight ratio.

6. The optical film of claim 5, wherein the predefined weight ratio is a ratio of the weight of the red phosphor, the weight of the green phosphor, and the weight of the inorganic particles, which are determined based on color coordinate values of white light.

7. The optical film of claim 6, wherein the weight ratio of the red phosphor is larger than the weight ratio of the green phosphor, and the weight ratio of the green phosphor is larger than the weight ratio of the inorganic particles.

8. The optical film of claim 7, wherein the weight ratio of the red phosphor is defined within 10% to 80%, the weight ratio of the green phosphor is defined within 10% to 80%, and the weight ratio of the inorganic particles is defined as 1% to 10%.

9. The optical film of claim 5, further comprising an inorganic particle layer including inorganic particles.

10. The optical film of claim 5, wherein a plurality of reflection patterns are arranged on the other surface of the second base film.

11. A backlight unit comprising:
    a light emitting diode (LED) source; and
    an optical film having a first base film and a diffusion lens layer disposed on one surface of the first base film and including a plurality of square pyramid-shaped lenses,
    wherein each square pyramid-shaped lens of the plurality of square pyramid-shaped lenses comprises:
      an apex;
      a square-shaped base surface having four corners; and
      four edges joining the apex to the four corners of the square-shaped base surface,
    wherein each of the four edges of the each square pyramid-shaped lens is curved,
    wherein among the plurality of square pyramid-shaped lenses, a first and a second quadrangular pyramid-shaped lenses are adjacent to each other such that an edge of a square-shaped base surface of the first quadrangular pyramid-shaped lens contacts an edge of a square-shaped base surface of the second quadrangular pyramid-shaped lens and forms a boundary line between the first and second quadrangular pyramid-shaped lenses,
    wherein one lateral surface of the first quadrangular pyramid and one lateral surface of the second quadrangular pyramid facing each other are symmetrical with respect to the boundary line,
    wherein the light emitting diode light source is disposed under the diffusion lens layer, and
    wherein the light emitting diode light source includes a mini LED or a micro lens, and wherein the the chip size of the mini LED light source is larger than 100 μm and equal to or less than 200 μM, and the chip size of the micro LED light source is less than 100 μm.

12. A liquid crystal display (LCD) device comprising:
    an LCD panel; and
    a backlight unit disposed under the LCD panel,
    wherein the backlight unit comprises
      an optical film having a first base film and a diffusion lens layer disposed on one surface of the first base film and including a plurality of square pyramid-shaped lenses,
    wherein each square pyramid-shaped lens of the plurality of square pyramid-shaped lenses comprises:
      an apex;
      a square-shaped base surface having four corners; and
      four edges joining the apex to the four corners of the square-shaped base surface,
    wherein each of the four edges of the each square pyramid-shaped lens is curved,
    wherein among the plurality of square pyramid-shaped lenses, a first and a second quadrangular pyramid-shaped lenses are adjacent to each other such that an edge of a square-shaped base surface of the first quadrangular pyramid-shaped lens contacts an edge of a square-shaped base surface of the second quadrangular pyramid-shaped lens and forms a boundary line between the first and second quadrangular pyramid-shaped lenses, and
    wherein one lateral surface of the first quadrangular pyramid and one lateral surface of the second quadrangular pyramid facing each other are symmetrical with respect to the boundary line.

* * * * *